(12) United States Patent
Haubennestel et al.

(10) Patent No.: US 7,504,469 B2
(45) Date of Patent: Mar. 17, 2009

(54) POLYESTER-MODIFIED POLYSILOXANES AND THEIR USE AS ADDITIVES FOR THERMOPLASTICS, MOULDING COMPOUNDS AND COATING MATERIALS

(75) Inventors: Karlheinz Haubennestel, Wesel (DE); Alfred Bubat, Wesel (DE); Hans-Willi Boegershausen, Toenisvorst (DE); Wolfgang Griesel, Hamminkeln (DE); Ulrich Nolte, Wesel (DE)

(73) Assignee: BYK-Chemie GmbH (DE)

( * ) Notice: Subject to any disclaimer, the term of this patent is extended or adjusted under 35 U.S.C. 154(b) by 158 days.

(21) Appl. No.: 11/178,231

(22) Filed: Jul. 8, 2005

(65) Prior Publication Data

US 2006/0009555 A1    Jan. 12, 2006

(30) Foreign Application Priority Data

Jul. 8, 2004   (DE) ................. 10 2004 033 060

(51) Int. Cl.
*C08G 77/04* (2006.01)
*C07F 7/08* (2006.01)
*C07F 7/00* (2006.01)

(52) U.S. Cl. ................ 528/25; 528/26; 528/28; 528/29; 556/437; 556/450; 556/453

(58) Field of Classification Search ............ 424/78.02; 524/261, 267; 528/26, 411; 525/440
See application file for complete search history.

(56) References Cited

U.S. PATENT DOCUMENTS

| | | | |
|---|---|---|---|
| 3,691,257 | A | 9/1972 | Kendrick et al. |
| 3,778,458 | A | 12/1973 | Morehouse |
| 4,613,641 | A | 9/1986 | Haubennestel et al. |
| 4,812,518 | A | 3/1989 | Haubennestel et al. |
| 5,132,392 | A | 7/1992 | DeYoung et al. |
| 5,179,142 | A * | 1/1993 | Ono et al. ............ 524/35 |
| 5,385,730 | A * | 1/1995 | Ichinohe ............ 424/78.02 |
| 5,417,867 | A | 5/1995 | Mikami et al. |

FOREIGN PATENT DOCUMENTS

| | | |
|---|---|---|
| DE | 1092585 | 11/1960 |
| DE | 1111320 | 7/1961 |
| DE | 3427208 A1 | 2/1986 |
| DE | 4011942 | 10/1990 |
| EP | 0175092 A2 | 8/1985 |
| EP | 0473812 | 3/1992 |
| EP | 0548452 A1 | 6/1993 |
| JP | 02099558 | 4/1990 |
| JP | 05339377 | 12/1993 |
| JP | 06128380 | 5/1994 |

* cited by examiner

*Primary Examiner*—Randy Gulakowski
*Assistant Examiner*—Robert Loewe
(74) *Attorney, Agent, or Firm*—Schwegman, Lundberg & Woessner, P.A.

(57) ABSTRACT

The invention relates to polyester-modified poly-siloxanes of the general formula (I)

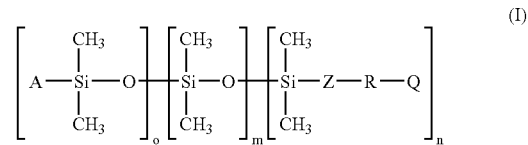

where
A is an alkyl group having 1 to 8 carbon atoms, Z is an aliphatic group having 1 to 14 carbon atoms, R is an aliphatic and/or cycloaliphatic and/or aromatic polyester group containing at least 3

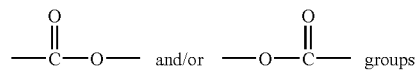

and having a weight-average molecular weight of 200 to 4000 g/mol, with no Zerewitinoff hydrogen atoms, Q is a group which contains no Zerewitinoff hydrogen atoms and is free from reactive carbon-carbon multiple bonds, m is 3 to 200 and o+n=2, with both o and n being other than zero.

The invention further relates to the use of the compounds of the invention in thermoplastics, moulding compounds and coating materials.

10 Claims, No Drawings

POLYESTER-MODIFIED POLYSILOXANES AND THEIR USE AS ADDITIVES FOR THERMOPLASTICS, MOULDING COMPOUNDS AND COATING MATERIALS

RELATED APPLICATIONS

This application claims priority under 35 U.S.C. 119 to German Application No. 10 2004 033 060.3, filed Jul. 8, 2004, which application is incorporated herein by reference and made a part hereof.

The invention relates to polyester-modified poly-siloxanes and to their use in thermoplastics, coating materials and moulding compounds which as a consequence are greatly enhanced in their scratch resistance and lubricity and in terms of their hydrophobic properties.

From DE-C-1111320 and DE-C-1092585 it is known to add low molecular weight dimethylpolysiloxanes and methyl-phenylpolysiloxanes to coating materials in order to enhance their flow properties and to increase their scratch resistance and lubricity. In many cases, however, adding polydimethylsiloxanes results in unwanted turbidity in unpigmented coating materials and also to poor flow properties, as is manifested in what is called pock-marking. If the molecular weights chosen for the pure polydimethylsiloxanes are too high, severe defects occur in the coating materials, and are perceptible as craters or what are called fish-eyes.

Although polymethylphenylsiloxanes are generally of good compatibility in the coating materials and also lead to an enhancement of the flow properties of the coating materials to which they are added, the scratch resistance that can be achieved with them is inadequate.

The incompatibilities which occur in coating systems as a result of siloxanes are also observed similarly in thermoplastics.

EP 0 175 092 B1 describes how polyester-modified siloxanes increase the scratch resistance and lubricity of coating materials and moulding compounds, an effect accompanied by good compatibility and excellent temperature stability. The siloxanes therein are branched, polyester-modified polysiloxanes with polyester moieties in the side chain.

EP 0 217 364 B1 describes compounds possessing a structure similar to that known from EP 0 175 092 B1 but not mandatorily bearing a side group and, furthermore, comprising reactive end groups, such as hydroxyl groups, carboxyl groups, isocyanate groups or vinylic groups.

Surprisingly it has been found that polyester-modified polysiloxanes having an XY block structure, block X being composed of a polyester and block Y of a polysiloxane, and having an end group which is free from reactive groups exhibit a drastically increased activity in respect of lubricity, scratch resistance and water repellency in the end products comprising these compounds in comparison to the compounds of the prior art.

The invention accordingly provides polyester-modified polysiloxanes of the general formula (I)

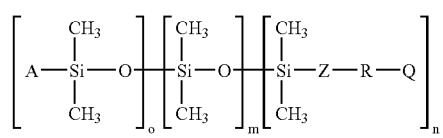

where
A is an alkyl group having 1 to 8 carbon atoms, Z is an aliphatic group having 1 to 14 carbon atoms, R is an aliphatic and/or cycloaliphatic and/or aromatic polyester group containing at least 3

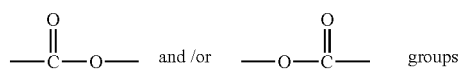

and having a weight-average molecular weight of 200 to 4000 g/mol, with no Zerewitinoff hydrogen atoms, Q is a group which contains no Zerewitinoff hydrogen atoms and is free from reactive carbon-carbon multiple bonds, m is 3 to 200 and o+n=2, with both o and n being other than zero.

Group A is not subject here to any general restrictions and can be a linear or branched alkyl group, such as methyl, ethyl, n-propyl, isopropyl, tert-butyl, butyl, pentyl, hexyl, heptyl or octyl, for example. Particular preference is given to linear alkyl groups having 1 to 4 carbon atoms.

Z is an aliphatic group having 1 to 14 carbon atoms, in particular an alkylene group having 1 to 14 carbon atoms, an alkylene ether or alkylene thioether group having 2 to 14 carbon atoms or an alkylene-amide group having 2 to 14 carbon atoms. The oxygen or sulphur in an alkylene ether or alkylene thioether group can be situated at any position in the chain containing 2 to 14 carbon atoms. The same applies to the amide moiety in an alkylene-amide (for example —(CH$_2$)$_3$NHCO—). The group Z serves critically to join the silicon atom of the polysiloxane constituent to the group R. Preferably the group Z stands for —(CH$_2$)$_3$—O—(CH$_2$)$_2$— or —(CH$_2$)$_2$—O—(CH$_2$)$_4$— or the corresponding thioethers.

The group R comprises an aliphatic and/or cycloaliphatic and/or aromatic polyester group containing at least 3

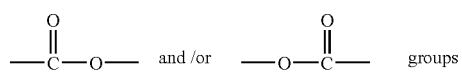

and having a weight-average molecular weight of 200 to 4000 g/mol, and containing no Zerewitinoff hydrogen atoms. Preferably the at least 3

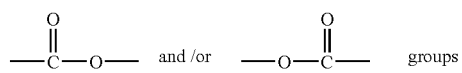

are joined to one another by divalent hydrocarbon groups having 2 to 12 carbon atoms, more preferably 4 to 6 carbon atoms. Groups of this kind can be produced, for example, by polymerizing lactones, such as propiolactone, caprolactone, valerolactone or dodecalactone, and derivatives thereof. Particular preference is given to saturated aliphatic hydrocarbon groups having 5 carbon atoms. Groups of this kind can be formed preferably by polymerizing ε-caprolactone.

Examples of suitable aromatic polyester groups include those based on phthalic anhydride, especially when the resulting polyester-modified polysiloxanes are to be used in coating materials which comprise binders based on phthalic esters.

Through the choice of suitable building blocks for the group R it is possible to achieve a broad compatibility of the compounds of the invention with a multiplicity of different polymer systems. In particular it is possible, as a result of the possible selection between aliphatic, cycloaliphatic (such as cyclohexanediyl, for example) and aromatic (such as phenylene, for example) constituents of the group R, to control the polarity of the compounds and so to tailor it to the particular end use. The synthesis of such polymers is sufficiently well known to the averagely skilled person in the field of the paints and plastics industries.

Q is a group which contains no Zerewitinoff hydrogen atoms and is free from reactive carbon-carbon multiple bonds. Q can be represented in particular by a radical —(O)—(CO)$_p$—(NH)$_q$—(CHR$^1$)$_r$—(CHR$^2$)$_s$—(O)$_t$—CR$^3$R$^4$R$^5$, in which p, q, r, s and t independently of one another are 0 or 1 and in which R$^1$, R$^2$, R$^3$, R$^4$ and R$^5$ independently of one another are H or a linear or branched alkyl radical having 1 to 18 carbon atoms, or R$^1$ and R$^3$ (in the case of p=q=0) together form a divalent radical —CH$_2$—CH$_2$—. Preferably two of the radicals R$^3$, R$^4$ and R$^5$ are hydrogen.

If p=q=r=s=t=0, Q is an alkoxy group. Where p=1 and q=r=s=t=0, Q is a carboxylic ester group. If p=q=1 and r=s=t=0, the group Q is a urethane group. Where p=q=0 and r=s=t=1, Q is an oxyalkylene ether group formed, for example, by enol endcapping of an OH group attached terminally to R. In general it is the case that Q can be derived from a reaction with an OH group attached terminally to R. The abovementioned carboxylic ester group, therefore, could be produced by reacting an OH group attached terminally to R with a carboxylic acid, a carboxylic anhydride or a carbonyl chloride or by reaction with other activated carboxylic acid derivatives, whereas the urethane group can be formed by reaction with an isocyanate.

When it is required, in the sense of the invention, that the polyester-modified polysiloxanes in the radicals R and Q are to contain no Zerewitinoff hydrogen atoms, this means that this requirement is essentially met. A small number of Zerewitinoff hydrogen atoms in the polyester-modified polysiloxane used does not cause any disruption. Since the synthesis of the polysiloxanes of the invention usually starts from compounds which contain Zerewitinoff hydrogen atoms, and since the degree of conversion to the end product is 100% only in an ideal case, unreacted precursors may be present to a certain extent in the product employed industrially. The degree of conversion with respect to Zerewitinoff hydrogen atoms in the intermediates, however, should as far as possible embrace 80%, more preferably 90% and ideally 95% to 100% of all Zerewitinoff hydrogen atoms.

The values of o and n add up to 2, with o and n each deviating from a value of 1, preferably by not more than 0.5, more preferably by not more than 0.25, and most preferably o=n=1. Where o=n=1, the preferred pure linear monofunctional products are those which can be prepared as described below. A further preparation possibility set out below is that of equilibration, in which case, alongside non-functional products, monofunctional and difunctional products are obtained. Insofar as the product obtained by equilibration contains different amounts of non-functional and di-functional by-products, values of o and n that deviate from 1 are obtained arithmetically. The value of n is calculated as follows: n=[(a mol % of non-functional polysiloxane)×0+(b mol % of monofunctional polysiloxane)×1+(c mol % of difunctional polysiloxane)×2]/100. For example, with 14.06 mol % of non-functional polysiloxane, 46.88 mol % of monofunctional polysiloxane and 39.06 mol % of difunctional polysiloxane, the value of n produced arithmetically is 1.25 (i.e. n=[14.06 mol %×0+46.88 mol %×1+39.06 mol %×2]/100=1.25).

The value m ought to be between 3 and 200, preferably between 10 and 100.

The compounds of the invention can be synthesized, for example, starting from linear monofunctional poly-siloxanes. Polysiloxanes of this kind can be prepared, for example, via living anionic polymerization of cyclic polysiloxanes. This process is described, inter alia, in T. Suzuki, Polymer 30 (1989) 333. Said reaction is illustrated by way of example in Reaction Scheme 1.

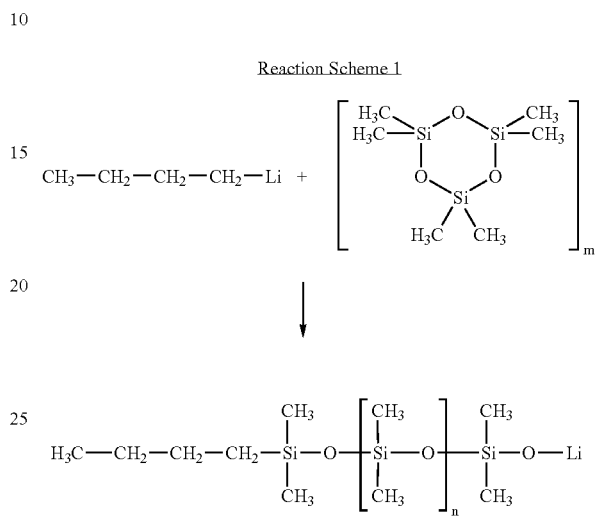

The SiH(CH$_3$)$_2$ functionalization of the end group can be accomplished by the methods that are known to the averagely skilled person, using functional chlorosilanes, dimethylchlorosilane for example, in the manner indicated in Reaction Scheme 2.

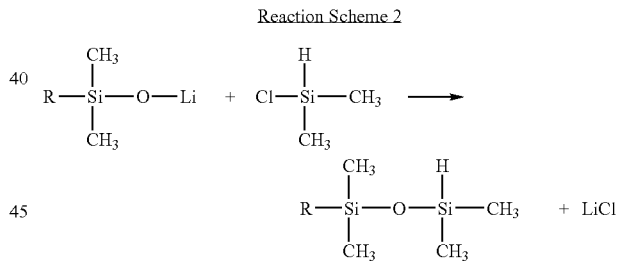

Another possibility for preparing linear, mono-functional polysiloxanes is that of equilibration of cyclic and open-chain polydimethylsiloxanes with terminally Si—H-difunctional polydimethylsiloxanes as described in Noll (Chemie und Technologie der Silicone, Wiley/VCH, Weinheim, 1984). For statistical reasons the reaction product is composed of a mixture of cyclic, difunctional, monofunctional and non-functional siloxanes. The fraction of linear siloxanes in the reaction mixture can be increased by a distillative removal of the lower cyclics. Within the linear polysiloxanes the fraction of SiH(CH$_3$)$_2$-monofunctional polysiloxanes in the reaction product of the equilibration ought to be as high as possible. If mixtures of linear polysiloxanes are used, the rule for the activity of the later products of the invention is that the higher the fraction of monofunctional end products of the invention the higher said activity. When mixtures are used the fraction of monofunctional end products of the invention ought preferably to be the largest fraction in the mixture and ought preferably to amount to more than 40% by weight. Typical equilibration products depleted of cyclic impurities contain preferably less than 40% by weight of difunctional and less than 15% by weight of non-functional linear polysiloxanes, the latter being present in particular at less than 5% by weight and ideally not at all.

In order to prepare the polyester-modified siloxanes used in accordance with the invention it is possible for the SiH(CH$_3$)$_2$-functional siloxanes to be reacted—as described in Examples 4 and 5—with terminally unsaturated polyesters, in the presence for example of Pt catalysts.

Linking of the polysiloxane moiety to prepare the target compound can, however, also be accomplished by any desired other processes, as described for example in EP 0 175 092. Thus, for example, the starting material may comprise commercially available compounds in which the polysiloxane moiety is reacted via a group Z-OH with the polyester moiety. This is also shown in Examples 1 or 6, for example.

The invention further provides a method of increasing the scratch resistance and increasing the lubricity of thermoplastics and coating materials and moulding compounds which is characterized in that a sufficient amount of the polyester-modified siloxane of the formula (I) is added to the thermoplastics, moulding compounds and coating materials.

Further provided by the invention are thermoplastics, moulding compounds and coating materials containing a flow-promoting and lubricity-enhancing amount of polyester-modified polysiloxanes of the invention. In particular it was surprising that, in addition to the greatly improved properties of the moulding compounds and coating materials, thermoplastics which comprise the polyester-modified polysiloxanes of the invention also profit from their activity.

Thermoplastics for the purposes of the invention can be poly(meth)acrylates, polyacrylonitrile, polystyrene, styrenic polymers (e.g. ABS, SEBS, SBS), polyesters, polycarbonates, polyethylene terephthalate, poly-butylene terephthalate, polyamides, thermoplastic polyurethanes (TPU), polyvinyl chloride, polyoxy-methylene, polyethylene, polypropylene. The thermoplastics may have been filled and/or pigmented. Thermoplastics for the purposes of the invention include mixtures (blends) of different kinds of thermoplastics. The thermoplastics may also, for example, comprise the spinnable thermoplastic fibres that are known to the averagely skilled person, such as polyester fibres or polyamide fibres, for example. Particularly preferred thermoplastics are those based on poly(methyl methacrylate) (PMMA).

Coating materials for the purposes of this invention may be any of a very wide variety of products. They may be clear varnishes, pigmented paints or coating materials which comprise dyes. They may comprise binders of any of a very wide variety of kinds, based on physically or chemically curing or drying binders. Examples of physically drying binders are those based on nitrocellulose, acrylate-methacrylate, chlorinated rubber, PVC copolymers, polyvinyl esters, polystyrene, polystyrene copolymers and copolymers of butadiene. Examples of chemically curable or chemically drying binders are air-drying alkyd resins, alkyd-melamine resins, acrylate-melamine resins, acrylate-isocyanate resins (PU resins), epoxy resins, saturated and unsaturated polyesters, phenol-formaldehyde resins and urea-alkyd resins.

As a liquid phase these coating materials may comprise organic solvents and/or water or plasticizers, such as is known in this field of the prior art as a function of the binders. The liquid phase may also be in the form of monomers or low molecular weight compounds which react with the other binder components to form the coatings.

The coating materials according to the invention may also be what are called powder coating materials, which thus contain no liquid phase and are applied in the form of powders to the substrates to be coated, where they are reacted. Powder coating materials are frequently applied using electrostatic application techniques.

The coating materials according to the invention thus in principle have the same composition as the known coating materials which can comprise polyester-modified polysiloxanes as additives. They may also comprise coatings additives which are otherwise customary, such as wetting agents, dispersants, fillers, catalysts and/or curing accelerators, and also agents having a rheological activity.

The coating materials are cured in accordance with the binders present in the coating materials, as is known to the skilled person. The effect of the polyester-modified polysiloxanes used in accordance with the invention is particularly advantageous in heat-curable coating materials, since the temperature stability of the polyester-modified polysiloxanes used in accordance with the invention is very high: for example, under baking conditions at temperatures up to 250° C. and for relatively short baking times even at temperatures up to about 350° C.

The remarks regarding moulding compounds are the same, mutatis mutandis, as made above with respect to the coating materials. By moulding compounds are meant compositions which can be processed to mouldings, the reactive resins and/or binders present in the compounds generally being cured at elevated temperature after and/or during shaping. Moulding compounds for the purposes of the invention are, for example, those based on unsaturated polyester resins and vinyl resins, to which it is possible as well to add thermoplastics such as polystyrene, polyvinyl acetate, polymethyl methacrylate and styrene-butadiene copolymers, in the form, for example, of components reducing contraction. Further moulding compounds are, in particular, polyurethanes and polyamides, which can be used, for example, in the reaction injection moulding process and exhibit particular difficulties in respect of demouldability.

Other moulding compounds may also have a construction based on epoxy resins. These epoxy resins are preferably used in the field of casting compounds and compression-moulding compounds. Further moulding compounds, which can be processed, for example, by the wet compression process, injection process or pultrusion process, are the phenol-formaldehyde condensation resins, also known by the term "phenolic resins".

The moulding compounds in general may likewise include the additives or other constituents that are customary in the prior art, such as have also been already mentioned above with respect to the coating materials. In particular it is possible for such moulding compounds to comprise reinforcing and/or non-reinforcing fillers, such as glass fibres, carbon fibres and polyamide fibres, for example, wollastonites, silicates, inorganic carbonates, aluminium hydroxide, barium sulphate and kaolins, and also nanoscale fillers based on alumina and silica.

The amount of polyester-modified polysiloxanes added to the thermoplastics, coating materials and moulding compounds is sufficient to achieve the desired effect with respect to adequate promotion of flow, increase in lubricity and enhancement of scratch resistance. Very small amounts may be sufficient to achieve a notable effect: for example, 0.005% by weight based on the total weight of the coating materials, moulding compounds or thermoplastics. Usually the amount of polyester-modified polysiloxanes is more than 0.01% by weight, preferably more than 0.05% by weight, based on the total weight of the thermoplastics, coating materials or moulding compounds. The upper limit on the amount of polyester-modified polysiloxanes is set by a sufficient effect and by the desire to minimize the amount, since these products are expensive, high-value products, and so for reasons of price an excessive addition is generally avoided. The upper limit generally lies at about 5% by weight, preferably at about 2% by weight and more preferably at about 1% by weight, based on the total weight of the thermoplastics, coating materials or moulding compounds.

Advantageous for use in the plastics industry are polyester-modified polysiloxanes whose melting point is above 40° C., preferably above 50° C., since solid polyester-modified polysiloxanes can be incorporated into the thermoplastics using standard plant technology. The melting point taken for the polyester-modified polysiloxanes of the invention is the temperature determined by means of DSC (differential scanning calorimetry) (DIN 53765). If the exothermic heat flux is plotted against the temperature, the point of greatest negative slope in the resulting plot is taken as the melting point. Solid polyester-modified polysiloxanes possess the advantage in particular that they can be supplied to the processing operation in the form of powders, pellets, flakes, granules or in some other form.

The examples which follow illustrate the invention without having any limiting effect.

EXAMPLE

Example 1

In a reaction vessel with stirrer and reflux condenser 406.8 g (0.25 mol) of polysiloxane of average formula

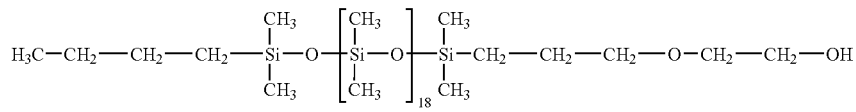

were admixed with 742.0 g (6.5 mol) of ε-caprolactone and following the addition of 100 ppm of dibutyltin dilaurate the mixture was heated under nitrogen to 180° C. After a reaction time of 6 hours the reaction mixture was cooled to 80° C. and 460.0 g of Shellsol A were added. Subsequently 73.9 g (0.25 mol) of stearyl isocyanate were added and the mixture was stirred at 80° C. for a further 30 minutes. By application of vacuum (40 mbar) and raising of the temperature to 160° C. the solvent was removed from the reaction mixture. The resulting product was a wax-like solid having a melting point of 53° C.

Example 2

Not Inventive

In a reaction vessel with stirrer and reflux condenser 507.5 g (0.25 mol) of polysiloxane of average formula

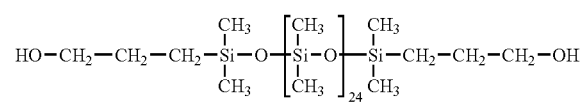

were admixed with 742.0 g (6.5 mol) of ε-caprolactone and following the addition of 100 ppm of dibutyltin dilaurate the mixture was heated under nitrogen to 180° C. After a reaction time of 6 hours the reaction mixture was cooled to 80° C. and 460.0 g of Shellsol A were added. Subsequently 147.8 g (0.5 mol) of stearyl isocyanate were added and the mixture was stirred at 80° C. for a further 30 minutes. By application of vacuum (40 mbar) and raising of the temperature to 160° C. the solvent was removed from the reaction mixture. The resulting product was a wax-like solid having a melting point of 51° C.

Application Example 0.05 g of the product from Example 1 was dissolved in 100 g of a solution of 10% polymethyl methacrylate in ethyl acetate. On a glass plate measuring 100×250 mm² a film 200 μm thick was produced. Removal of the solvent gave a coating having a film thickness of approximately 20 μm. A similar procedure was carried out using the product from Example 2. As a sample for comparison, a coating of the same kind on glass but without additive was used. The slip resistance was measured using an electrical film-drawing apparatus with constant advance rate. On the mount for the film-drawing ruler a tensile-pressure force transducer was mounted, which via a computer records every resistance met by the slip body. The slip body is moved in the tensile direction over the surface to be measured. The slip body used was a 500 g weight stone having a defined felt underlay. The transparency/clouding of the coatings was assessed by purely visual means. The contact angle was measured using a contact angle meter from Krüss. The advancing angle of the water drop on the test body was measured in the range between 8-12 μl drop volume. The scratch resistance was determined by means of the pencil hardness test along the lines of DIN EN 13523-4.

TABLE

| Sample | Slip resistance in newtons | Transparency | Pencil hardness along the lines of DIN EN 13523-4 | Contact angle measurement with water |
|---|---|---|---|---|
| Comparison sample | 5.3 | transparent | H | 76° |
| Example 1 | 1.7 | transparent | 4H | 94° |
| Example 2 (not inventive) | 4.1 | transparent | 2H | 86° |

Example 3

In a reaction vessel with reflux condenser 507 g (0.5 mol) of an unsaturated polyester of average formula

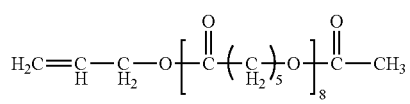

were mixed with 1798 g (0.45 mol) of a polysiloxane of average formula

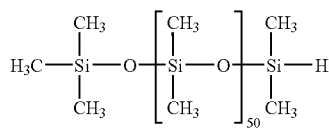

and 988 g of xylene under a nitrogen atmosphere and the mixture was heated to 100° C. Subsequently 1.4 g of a 6% strength solution of hexachloroplatinic acid in 2-propanol were added. After a reaction time of 3 hours the solvent was separated off in vacuo (40 mbar, 180° C.).

Example 4

In a reaction vessel with reflux condenser 57.1 g (0.1 mol) of an unsaturated polyester of average formula

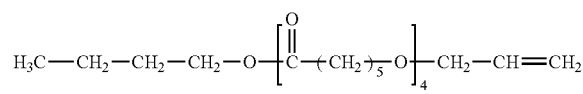

were mixed with 51.9 g (0.1 mol) of a siloxane of average formula

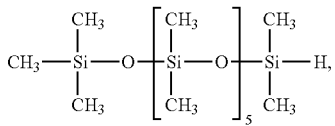

25 g of xylene were added and the mixture was heated under inert gas to 70° C. After a reaction time of two hours the solvent was removed in vacuo (20 mbar, 130° C.).

Example 5

In a reaction vessel with stirrer and reflux condenser 274.1 g (0.25 mol) of a polysiloxane of average formula

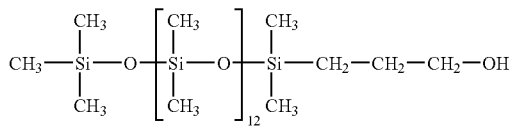

were admixed with a mixture of 131.3 g (1.15 mol) of ε-caprolactone and 115.2 g (1.15 mol) of δ-valerolactone and following the addition of 100 ppm of dibutyltin dilaurate the mixture was heated to 160° C. under nitrogen. After a reaction time of 6 hours the reaction mixture was cooled to 60° C., 0.3 mol of acetic anhydride and 200 ppm of 4-dimethylaminopyridine were added and the mixture was stirred at 60° C. for a further 30 minutes. Subsequently the resultant acetic acid and the remaining acetic anhydride were removed from the reaction mixture by application of vacuum (10 mbar).

The invention claimed is:

1. A polyester-modified polysiloxane of the general formula (I)

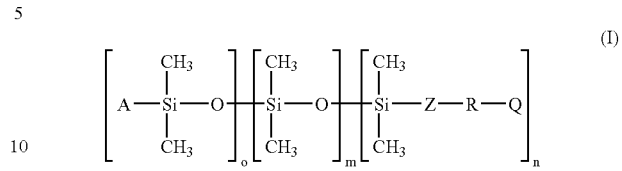

wherein

A is an alkyl group having 1 to 8 carbon atoms,

Z is selected from the group consisting of an alkylene group having 1 to 14 carbon atoms, an alkylene ether or alkylene thioether group having 2 to 14 carbon atoms and an alkylene-amide group having 2 to 14 carbon atoms, R is an aliphatic and/or cycloaliphatic and/or aromatic polyester group containing at least 3

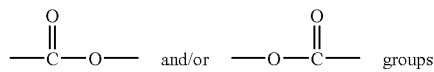

wherein the at least 3 groups in the radical R are joined to one another by divalent hydrocarbon groups having 2 to 12 carbon atoms; and wherein R has a weight-average molecular weight of 200 to 4000 g/mol, with no Zerewitinoff hydrogen atoms, Q is a group which contains no Zerewitinoff hydrogen atoms and is a radical —(O)—(CO)$_p$—(NH)$_q$—(CHR$^1$)$_r$ —(CHR$^2$)$_s$—(O)$_t$—CR$^3$R$^4$R$^5$, wherein p and q=1, r, s, and t=0, R$^1$ and R$^2$ independently of one another are hydrogen or a linear or branched alkyl radical having 1 to 18 carbon atoms, R$^3$ is a linear alkyl radical having 1 to 18 carbon atoms, and R$^4$ and R$^5$ are hydrogen; and, m is 3 to 200 and o+n=2, with both o and n being other than zero and o and n deviate on average in each case from a value of 1 by not more than 0.5.

2. A polyester-modified polysiloxane according to claim 1, wherein A is a linear alkyl group having 1 to 4 carbon atoms.

3. A polyester-modified polysiloxane according to claim 1 or 2, wherein the at least 3

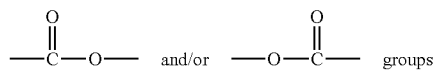

in the radical R are joined to one another by divalent hydrocarbon groups having 4 to 6 carbon atoms.

4. A polyester-modified polysiloxane according to claim 3, wherein R is a polycaprolactone group, a polyvalerolactone group or the group of a copolymer of caprolactone and valerolactone.

5. Polyester-modified polysiloxanes according to claim 1, possessing a melting point of at least 40° C.

6. An additive in a thermoplastic, a moulding compound or a coating material comprising one or more polyester-modified polysiloxanes of the general formula (I) according to claim 1.

7. A method of promoting flow, increasing lubricity and scratch resistance of thermoplastics, moulding compounds and coating materials, comprising adding an effectively flow-promoting, lubricity- and scratch-resistance-increasing amount of one or more polyester-modified polysiloxanes of the general formula (I) according to claim 1 to the thermoplastics, moulding compounds and coating materials.

8. A method according to claim 7, wherein the effective amount of the polyester-modified polysiloxanes is 0.005% to 5% by weight, based on the total weight of the thermoplastics, moulding compounds and coating materials.

9. A thermoplastic, coating material or moulding compounds comprising one or more polyester-modified polysiloxanes of the general formula (I) according to claim 1.

10. The thermoplastic according to claim 9, in the form of thermoplastic fibres.

* * * * *